(12) United States Patent
Roberts et al.

(10) Patent No.: US 8,196,344 B1
(45) Date of Patent: Jun. 12, 2012

(54) MODULAR PLANT TOWER ASSEMBLY

(76) Inventors: Sharon Jane Roberts, Charlotte, NC (US); Nancy Jean Roberts, Atlanta, GA (US)

(*) Notice: Subject to any disclaimer, the term of this patent is extended or adjusted under 35 U.S.C. 154(b) by 0 days.

(21) Appl. No.: 12/590,880

(22) Filed: Nov. 16, 2009

(51) Int. Cl.
 *A01G 17/06* (2006.01)
(52) U.S. Cl. .................................. 47/45; 47/70; 47/25.1
(58) Field of Classification Search ................ 47/44, 45, 47/47, 70, 66; 211/134; 135/100, 121, 124; *A01G 17/04, 17/06, 17/14*
See application file for complete search history.

(56) References Cited

U.S. PATENT DOCUMENTS

| | | | | |
|---|---|---|---|---|
| 2,842,145 A * | 7/1958 | Wilson, Jr. | | 135/100 |
| 3,042,052 A * | 7/1962 | Des Rosier | | 135/100 |
| 3,258,020 A * | 6/1966 | McDonald | | 135/100 |
| 3,462,021 A * | 8/1969 | Hawke et al. | | 211/182 |
| 3,803,759 A * | 4/1974 | Heinecke | | 47/47 |
| 4,019,280 A * | 4/1977 | Summers | | 47/45 |
| 4,423,849 A * | 1/1984 | Jordan | | 248/165 |
| 4,785,576 A * | 11/1988 | Morgan | | 47/29.1 |
| 4,838,293 A * | 6/1989 | Novak | | 135/100 |
| 5,423,148 A * | 6/1995 | Thornhill | | 47/29.1 |
| D359,929 S * | 7/1995 | Thornhill | | D11/143 |
| 5,439,016 A * | 8/1995 | Grahn | | 135/100 |
| 5,809,989 A * | 9/1998 | Nelson | | 126/544 |
| 5,836,331 A * | 11/1998 | Grahn | | 135/94 |
| 6,009,680 A * | 1/2000 | Mathews | | 52/665 |
| 6,349,502 B1 * | 2/2002 | Fernandez | | 47/45 |
| 2006/0207957 A1 * | 9/2006 | Chen | | 211/188 |
| 2008/0263949 A1 * | 10/2008 | Early | | 47/83 |
| 2009/0044446 A1 * | 2/2009 | Kellogg et al. | | 47/45 |
| 2010/0101144 A1 * | 4/2010 | Kurtz | | 47/66.7 |
| 2010/0252520 A1 * | 10/2010 | Hsu | | 211/186 |

FOREIGN PATENT DOCUMENTS

DE 4121597 A1 * 1/1993
EP 21962 A1 * 1/1981

* cited by examiner

*Primary Examiner* — Rob Swiatek
*Assistant Examiner* — Lisa Tsang
(74) *Attorney, Agent, or Firm* — Schwartz Law Firm, P.C.

(57) ABSTRACT

A modular plant tower assembly includes a self-supporting vertical framework of rigid vertical supports defining a relatively large base, and extending inwardly and upwardly from the base to a smaller top of the vertical framework. At least one horizontal closed-end framework includes rigid horizontal supports. The horizontal supports are interconnected at their respective ends, and surround the vertical framework at a location intermediate the base and the top. At least one of the horizontal supports forms a lateral bridge connector. The bridge connector is adapted for connecting one end of a bridge frame to the plant tower assembly, and an opposite end of the bridge frame being connected to an adjacent like tower assembly.

9 Claims, 5 Drawing Sheets

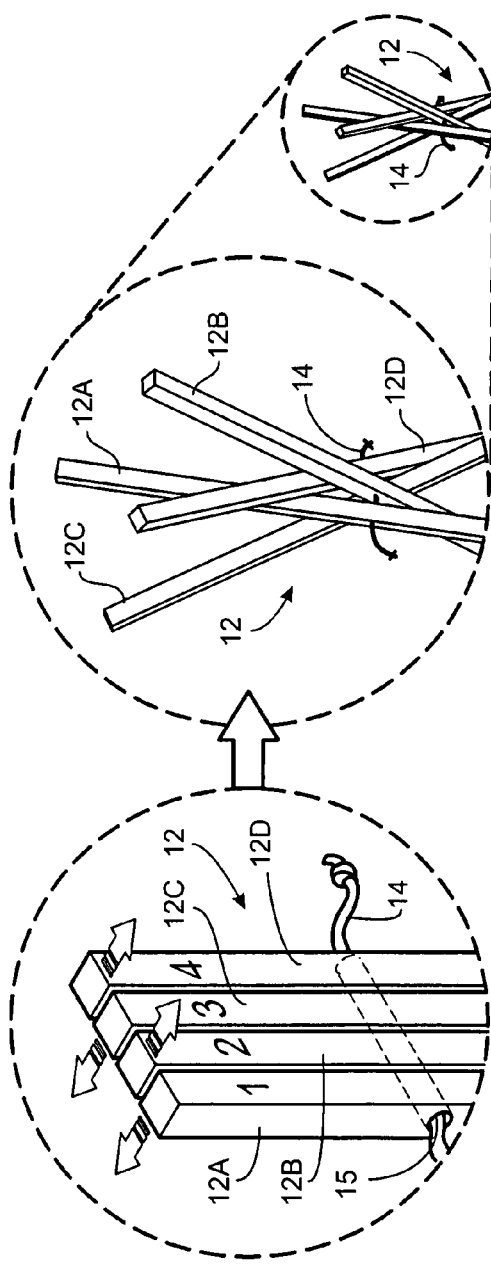
Fig.3A
Fig.3B
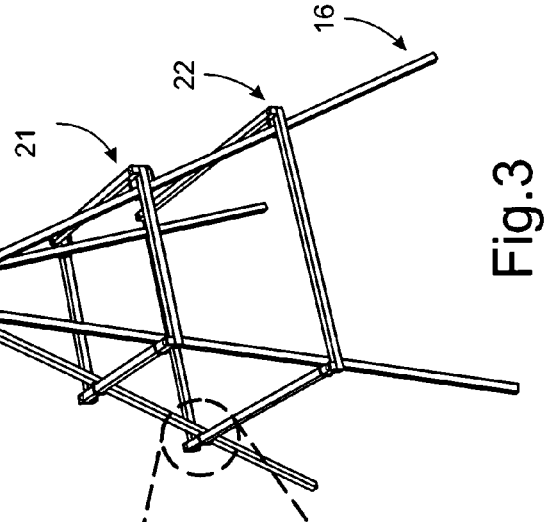
Fig.3
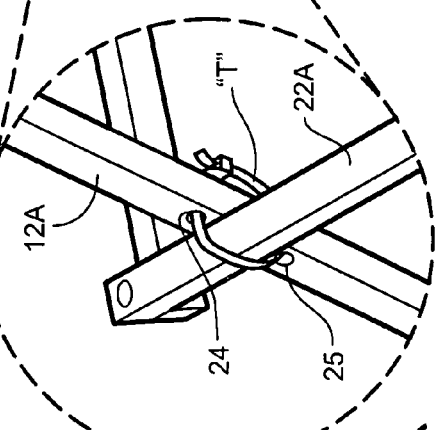
Fig.3C

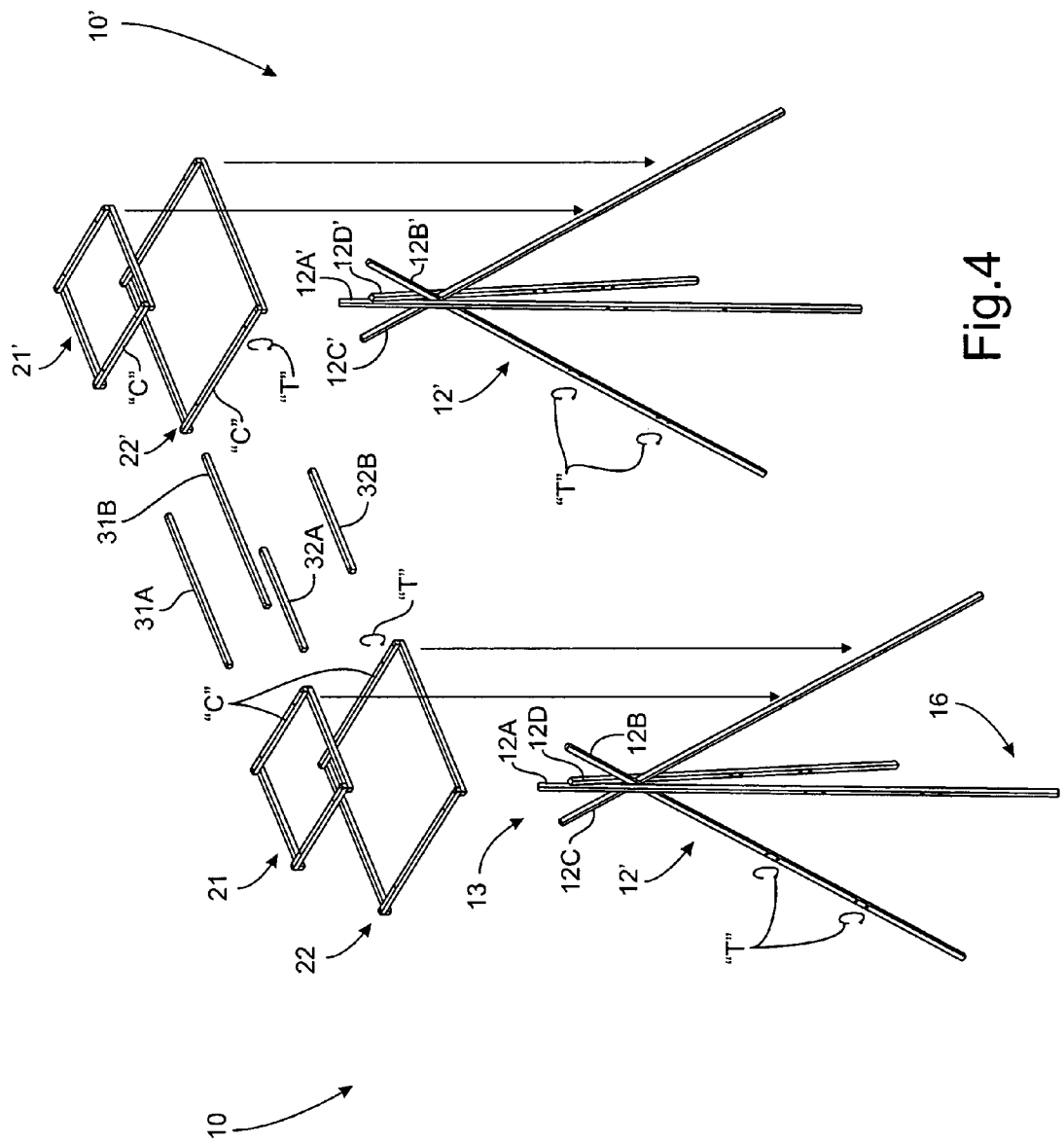

MODULAR PLANT TOWER ASSEMBLY

TECHNICAL FIELD AND BACKGROUND

The present disclosure relates broadly to a modular plant tower assembly, and method for supporting a growing plant. The exemplary assembly and method are applicable to a wide variety of plants, such as tomato plants.

SUMMARY OF EXEMPLARY EMBODIMENTS

Various exemplary embodiments of the present invention are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

According to one exemplary embodiment, the disclosure comprises a modular plant tower assembly. The tower assembly includes a self-supporting vertical framework of rigid vertical supports defining a relatively large base, and extending inwardly and upwardly from the base to a smaller top of the vertical framework. At least one horizontal closed-end framework comprises rigid horizontal supports. The horizontal supports are interconnected at their respective ends and surround the vertical framework at a location intermediate the base and the top. At least one of the horizontal supports comprises a lateral bridge connector. The bridge connector is adapted for connecting one end of a bridge frame to the plant tower assembly, and an opposite end of the bridge frame being connected to an adjacent like tower assembly.

The terms "modular plant tower assembly", "tower assembly", and the like refer broadly herein to an entirely or partially pre-assembled self-supporting structure, a partially assembled structure sold with other partially assembled or disassembled parts intended for subsequent assembly, and a kit (such as a do-it-yourself kit) with individual partially assembled and disassembled parts intended for subsequent assembly.

According to another exemplary embodiment, the vertical framework has an open-sided pyramidal form.

According to another exemplary embodiment, means are provided for connecting the horizontal framework to an outside of the vertical framework.

According to another exemplary embodiment, the means for connecting comprises a plurality of flexible ties. Alternative exemplary means for connecting may include hook-and-look straps, twine, string, mechanical clips, adhesives, and the like.

According to another exemplary embodiment, means are provided for loosely interconnecting the vertical supports at the top of the vertical framework.

According to another exemplary embodiment, each of vertical supports defines a rope hole therein proximate the top of the vertical framework, and wherein the means for loosely interconnecting comprises a flexible rope passed through each of the rope holes formed with the vertical supports.

Alternative exemplary means for loosely interconnecting may include flexible wire, pins, brackets, straps, and the like.

According to another exemplary embodiment, upper and lower horizontal frameworks are vertically spaced apart and located on an outside of the vertical framework.

According to another exemplary embodiment, each of the upper and lower horizontal frameworks defines a substantially square shape.

According to another exemplary embodiment, the lower horizontal framework is at least 50% larger than the upper horizontal framework—the size of the framework being measured by the area defined by the framework. For example, a square framework having 12-inch sides has an area of 144 square inches.

In another exemplary embodiment, the disclosure comprises an arrangement of modular plant tower assemblies. The exemplary arrangement incorporates at least first and second plant tower assemblies, such as described herein, and a horizontal bridge frame spanning the first and second tower assemblies. The bridge frame comprises rigid horizontal bridge supports secured to respective lateral bridge connectors of the first and second tower assemblies.

In yet another exemplary embodiment, the disclosure comprises a method for supporting plants. The method includes erecting a modular plant tower assembly comprising a self-supporting vertical framework. The vertical framework includes rigid vertical supports arranged to form a relatively large base, and extending inwardly and upwardly from the base to a smaller top of the vertical framework. The vertical framework is surrounded by at least one horizontal closed-end framework of rigid horizontal supports. The horizontal supports are interconnected at their respective ends, and are located intermediate the base and the top of the vertical framework. At least one of the horizontal supports comprising a lateral bridge connector. One end of a horizontal bridge frame is then connected to the lateral bridge connector, while an opposite end of the horizontal bridge frame is connected to an adjacent like plant tower assembly.

BRIEF DESCRIPTION OF THE DRAWINGS

The description of exemplary embodiments proceeds in conjunction with the following drawings, in which:

FIG. 3 is a view of the plant tower assembly with various sections isolated and enlarged in FIGS. 3B and 3C;

FIG. 3A is an enlarged fragmentary view of the loosely connected vertical supports aligned prior to spreading outwardly to form the self-supporting vertical framework of the tower assembly;

FIG. 3B is an enlarged fragmentary view of the top of the vertical framework, and showing respective interleaved ends of the vertical supports;

FIG. 3C is an enlarged fragmentary view showing a corner portion of the lower horizontal framework connected to the vertical framework;

FIG. 4 shows adjacent plant tower assemblies and horizontal bridge frames with parts thereof exploded away; FIG. 5A is an enlarged fragmentary view showing a corner portion of the upper horizontal framework attached to the vertical framework and bridge frame.

DESCRIPTION OF EXEMPLARY EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
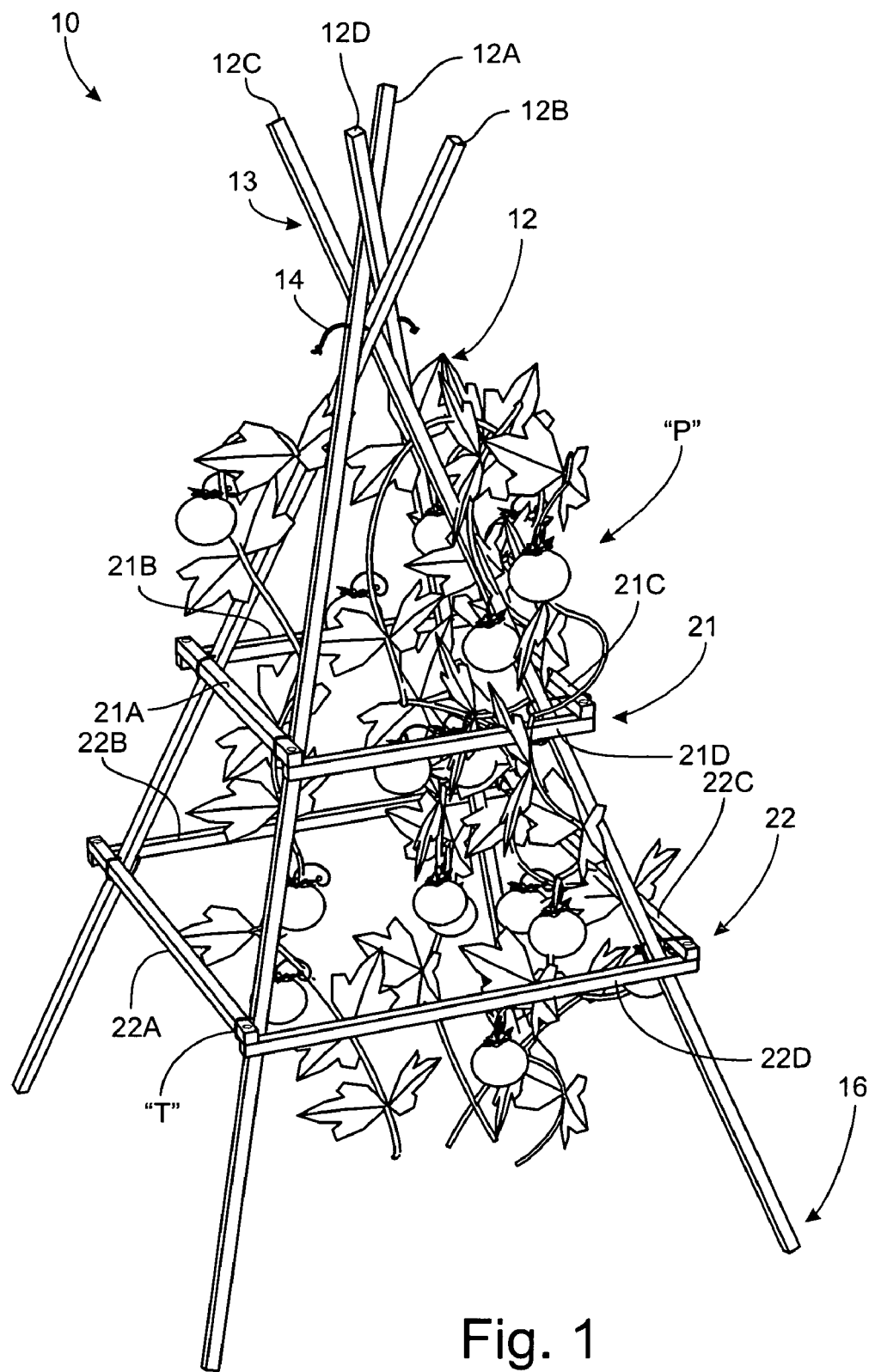
FIG. 1 is an environmental perspective view of a modular plant tower assembly according to one exemplary embodiment of the present disclosure.
Figure 2:
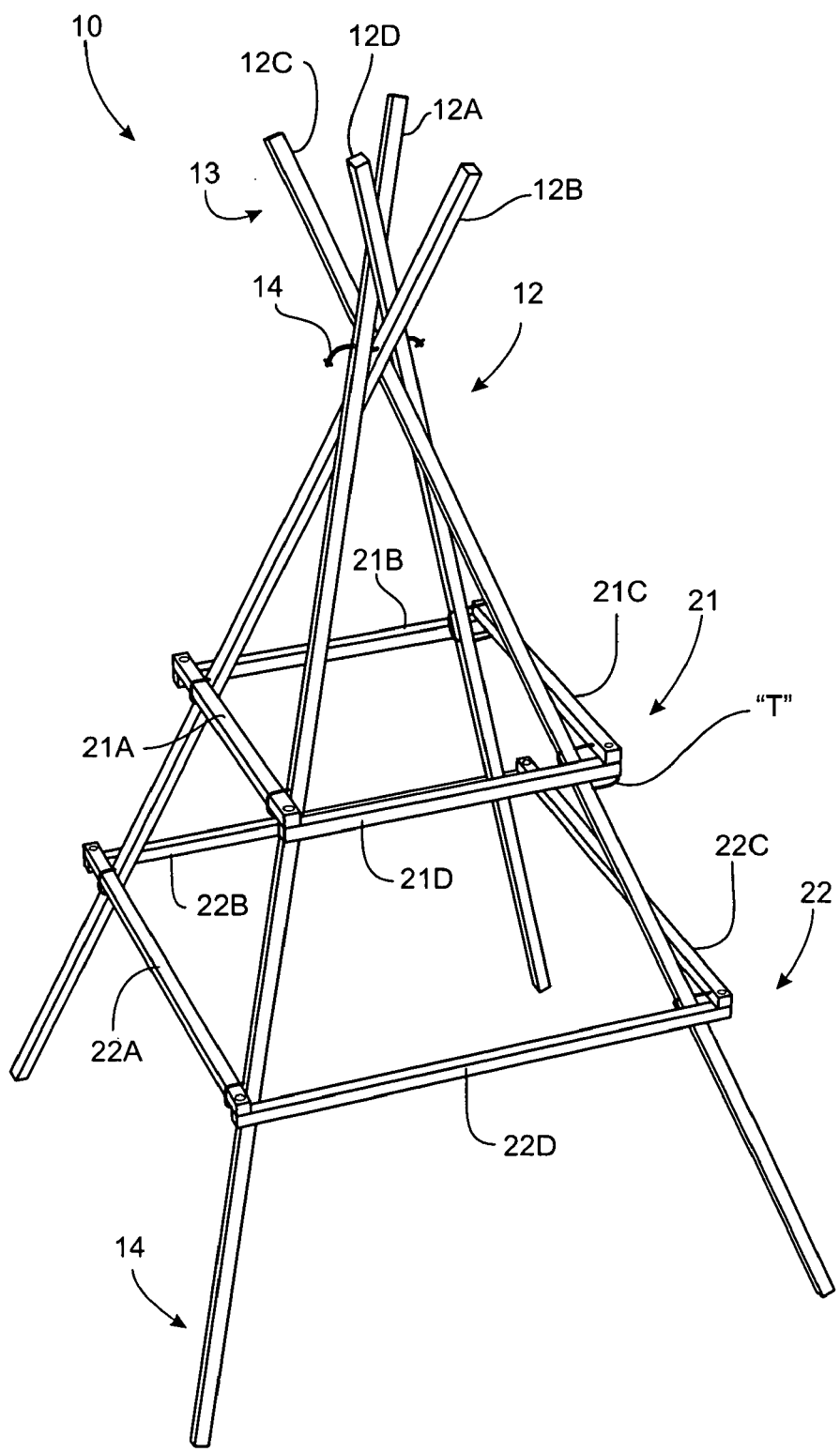
FIG. 2 is a further perspective view of the exemplary plant tower assembly.

Referring now specifically to the drawings, a modular plant tower assembly according to one exemplary embodiment of the present disclosure is illustrated in FIGS. 1 and 2, and shown generally at reference numeral 10. The exemplary plant tower assembly 10 includes a self-supporting vertical framework 12 comprising a number of spaced apart rigid vertical supports 12A, 12B, 12C, 12D. The vertical supports 12A-12D are loosely interconnected near a top 13 of the framework 12 using a flexible rope 14, or other suitable means. The rope 14 is passed through substantially aligned rope holes 15 (FIG. 3A), and is knotted at its opposite ends to prevent inadvertent separation of the supports 12A-12D. The vertical supports 12A-12D are interleaved at their respective top ends adjacent the frame's rope attachment point, as demonstrated in FIGS. 3A and 3B, and diverge downwardly and outwardly towards respective bottom ends to form a larger base 16. The resulting structure defines an open-sided, generally pyramidal form designed for supporting a growing plant "P", such as tomato plants.

In the exemplary embodiment, the plant tower assembly 10 further includes upper and lower vertically-spaced, closed-end horizontal frameworks 21, 22 located outside of vertical framework 12, and secured to the vertical framework 12 at respective intermediate points using flexible ties "T" (e.g., "zip ties") or other means, such as hook-and-look straps, twine, clips, or the like. Each exemplary framework 21, 22 has a substantially square form, and comprises rigid horizontal supports 21A-21D, 22A-22D which are connected together at their respective ends using rivets, screws, bolts, tacks, or other hardware. As best shown in FIG. 3C, the flexible ties "T" extend through spaced tie holes 24, 25 formed with the vertical supports 12A-12D (only 12A shown), and around the horizontal supports 21A-21D, 22A-22D (22A shown) of respective upper and lower horizontal frameworks 21, 22. The lower horizontal framework 22 is substantially larger than the upper horizontal framework 21; and in one example, may be at least 50% larger than the upper framework 21—the size being measured by an area defined by the square form.

For each of the upper and lower horizontal frameworks 21, 22, the rigid horizontal supports 21A-21D, 22A-22D may form respective lateral bridge connectors "C" designed to connect one end of a horizontal bridge frame 31, 32 to the plant tower assembly 10. As discussed further below, the opposite end of the horizontal bridge frame 31, 32 is connected to a lateral bridge connector "C" (i.e., select horizontal support) of an adjacent plant tower assembly 10' (See FIG. 5). Like elements of the tower assemblies 10 and 10' are indicated in prime notation (') in FIG. 5.

FIG. 4 demonstrates assembly and interconnection of adjacent modular plant tower assemblies 10 and 10'. Each plant tower assembly 10, 10' may be packaged (either together or separately) in a do-it-yourself kit of unassembled or partially assembled parts, and may be erected on-site without special tools or special hardware. The rigid vertical supports 12A-12D of the vertical framework 12 are first spread out into a substantially pyramidal form from the rope-connected top 13 to the open-sided base 16 of the framework 12. The upper and lower horizontal frameworks 21, 22 are then positioned over the self-supported vertical framework 12, and are secured to the vertical framework 12 using flexible ties "T" as previously discussed. The second plant tower assembly 10' may be assembled in a manner identical to the first. Once both are assembled, the plant tower assemblies 10 and 10' are spaced apart such that horizontal bridge supports 31A, 31B and 32A, 32B of the upper and lower bridge frames 31, 32 substantially abut corresponding bridge connectors "C" of the adjacent assemblies 10, 10'. As best shown in FIG. 5A, each bridge connector "C" and bridge support 31A, 31B, 32A, 32B may have tie holes 35, 36 formed at their respective opposite ends. Corresponding tie holes are aligned to receive the flexible ties "T" (e.g., zip ties), as previously described. The ties "T" cooperate to flexibly secure the horizontal bridge frames 31, 32 to the interconnected plant tower assemblies 10, 10', thereby enabling slight placing adjustments of one plant tower assembly relative to the other based on elevation differences and the underlying terrain.

Figure 5:
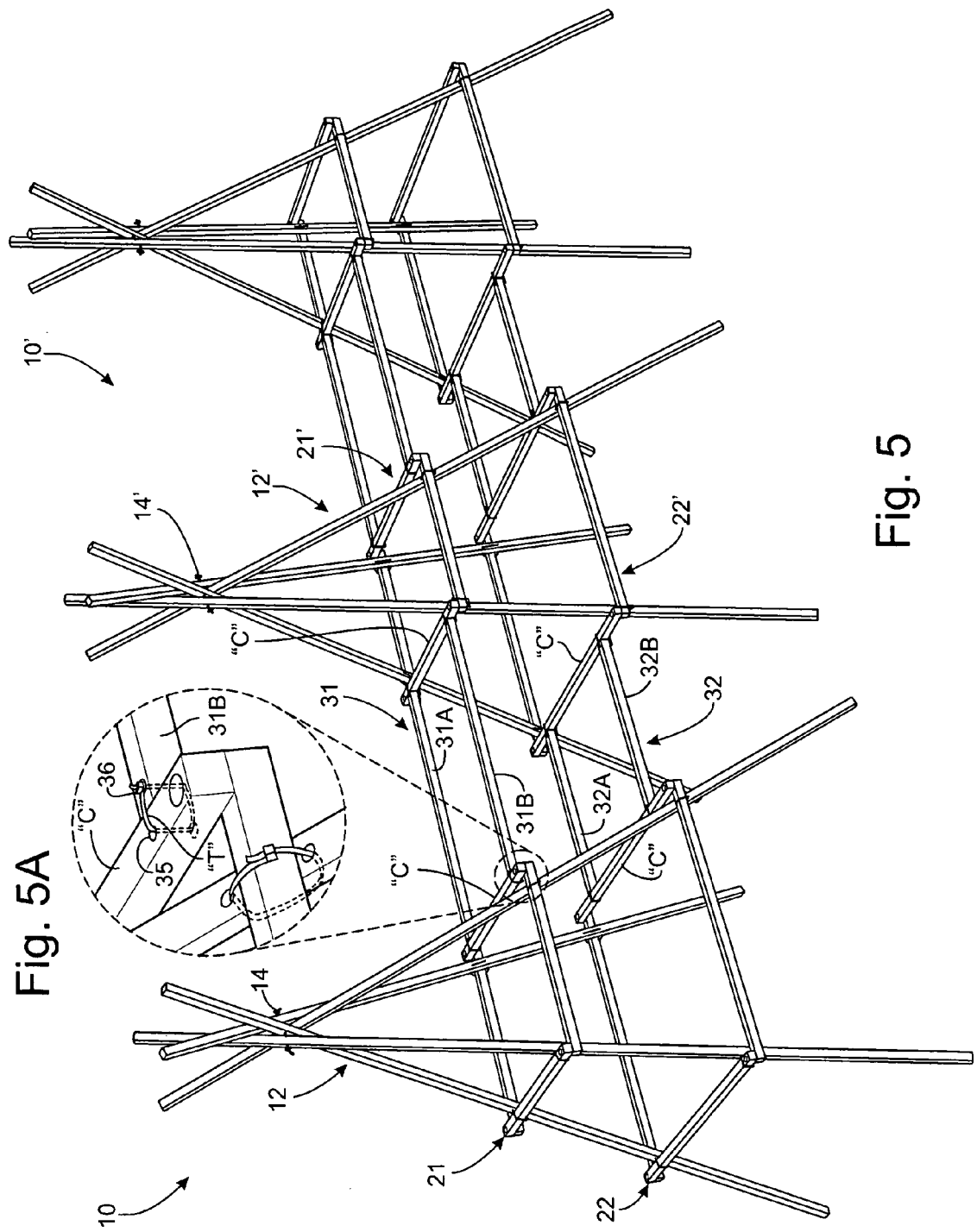
FIG. 5 is a perspective view showing an exemplary arrangement of multiple plant tower assemblies interconnected by upper and lower bridge frames.

Referring to FIG. 5, the exemplary plant tower assembly 10 may be arranged linearly with other like assemblies 10' (such as shown), or in a matrix of any desired configuration including three or more assemblies interconnected to one or more other assemblies. A single exemplary plant tower assembly 10 may interconnect via bridge frames 31, 32 with as many as four other like assemblies. The plant tower assemblies 10, 10' may be interconnected by both upper and lower bridge frames 31, 32, as shown, or only a single bridge frame, or by three or more vertically-spaced bridge frames. Additionally, either bridge frame 31, 32 may comprise first and second bridge supports 31A, 31B, 32A, 32B, as shown, or only a single bridge support, or three or more laterally-spaced bridge supports. The vertical and horizontal frameworks and/or bridge frames may be constructed of wood or other substantially rigid material, including plastic, fiberglass, aluminum, or the like. In various other exemplary uses, the plant tower assembly 10 may be combined with other like assemblies, as described above, and/or with other structural supports including one or more vertical plant stakes, horizontal frame elements, and conventional cages, plant supports, and the like.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under §112, 6th paragraph is not intended. Additionally, it is not intended that the scope of patent protection afforded the present invention be defined by reading into any claim a limitation found herein that does not explicitly appear in the claim itself.

We claim:

1. An arrangement of modular plant tower assemblies, comprising:
   (a) a first generally pyramidal plant tower assembly comprising:
      i. a self-supporting vertical framework of rigid vertical supports defining a relatively large base, and extending inwardly and upwardly from said base to a smaller top of said vertical framework;
      ii. upper and lower vertically spaced horizontal closed-end frameworks of respective rigid horizontal supports, said horizontal supports of each horizontal framework being interconnected at their respective ends and surrounding said vertical framework at a location intermediate said base and said top; and
      iii. at least one of said horizontal supports of each horizontal framework comprising a lateral bridge connector;
   (b) a second generally pyramidal plant tower assembly spaced apart from said first plant tower assembly, and comprising:
      i. a self-supporting vertical framework of rigid vertical supports defining a relatively large base, and extending inwardly and upwardly from said base to a smaller top of said vertical framework;
      ii. upper and lower vertically spaced horizontal closed-end frameworks of respective rigid horizontal supports, said horizontal supports of each horizontal framework being interconnected at their respective ends and surrounding said vertical framework at a location intermediate said base and said top; and
      iii. at least one of said horizontal supports of each horizontal framework comprising a lateral bridge connector; and
   (c) upper and lower vertically spaced horizontal bridge frames spanning said first and second spaced apart tower assemblies, and each bridge frame comprising elongated rigid horizontal bridge supports secured to respective lateral bridge connectors of each upper and lower horizontal framework of said first and second spaced apart tower assemblies, whereby said upper horizontal bridge frame defines a relatively large opening compared to a relatively small opening defined by said lower horizontal bridge frame, such that a space between said first and second tower assemblies is substantially inverse to a generally pyramidal form of each tower assembly.

2. An arrangement of modular plant tower assemblies according to claim 1, wherein at least one of said first and second plant tower assemblies further comprises means for connecting said horizontal framework to an outside of said vertical framework.

3. An arrangement of modular plant tower assemblies according to claim 2, wherein said means for connecting comprises a plurality of flexible ties.

4. An arrangement of modular plant tower assemblies according to claim 1, wherein at least one of said first and second plant tower assemblies further comprises means for loosely interconnecting the vertical supports at the top of said vertical framework.

5. An arrangement of modular plant tower assemblies according to claim 4, wherein each of said vertical supports of at least one of said first and second plant tower assemblies defines a rope hole therein proximate the top of said vertical framework, and wherein said means for loosely interconnecting comprises a flexible rope passed through each of said rope holes formed with said vertical supports.

6. An arrangement of modular plant tower assemblies according to claim 1, wherein each of said first and second plant tower assemblies further comprises upper and lower horizontal frameworks vertically spaced apart and located on an outside of said vertical framework.

7. An arrangement of modular plant tower assemblies according to claim 6, wherein each of said upper and lower horizontal frameworks defines a substantially square shape.

8. An arrangement of modular plant tower assemblies according to claim 7, wherein said lower horizontal framework is at least 50% larger than said upper horizontal framework.

9. An arrangement of modular plant tower assemblies according to claim 6, wherein said upper and lower horizontal frameworks comprise respective upper and lower lateral bridge connectors.

* * * * *